(12) United States Patent
Pawar et al.

(10) Patent No.: US 9,237,502 B1
(45) Date of Patent: Jan. 12, 2016

(54) SYSTEMS AND METHODS FOR BALANCING WIRELESS NETWORK LOAD BETWEEN BAND CLASSES USING AUTOMATIC NEIGHBOR RELATIONS

(71) Applicant: Sprint Spectrum LP, Overland Park, KS (US)

(72) Inventors: Hemanth Pawar, Brambleton, VA (US);
Daniel Vivanco, Sterling, VA (US);
Krishna Sitaram, Chantilly, VA (US);
Shilpa Kowdley, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 23 days.

(21) Appl. No.: 14/308,987

(22) Filed: Jun. 19, 2014

(51) Int. Cl.
*H04W 36/00* (2009.01)
*H04W 36/22* (2009.01)

(52) U.S. Cl.
CPC .................................... *H04W 36/22* (2013.01)

(58) Field of Classification Search
USPC ....................................... 455/436, 422.1, 403
See application file for complete search history.

(56) References Cited

PUBLICATIONS

Amirijoo, et al., "Neighbor Cell Relation List and Physical Cell Identity Self-Organization in LTE", 5 pages.

*Primary Examiner* — Martin Mushambo (57) ABSTRACT

Systems and methods are described for balancing wireless network load between band classes using automatic neighbor relations or another similar protocol. Serving cells may use neighbor lists to determine a number of first neighboring cells associated with band classes, the band classes being defined by signal frequencies. Over one or more periods of time, each of the serving cells may receive network characteristics for second neighboring cells. The neighbor lists may be reconfigured based on the network characteristics, and a number of second neighboring cells in each of the band classes in the reconfigured neighbor lists may be compared with the number of first neighboring cells in each of the band classes to determine a preferred band class for each serving cell or within a cluster of serving cells. Wireless devices may be instructed to initiate wireless connections with cells outside the preferred band class.

18 Claims, 6 Drawing Sheets

SYSTEMS AND METHODS FOR BALANCING WIRELESS NETWORK LOAD BETWEEN BAND CLASSES USING AUTOMATIC NEIGHBOR RELATIONS

TECHNICAL BACKGROUND

Cell selection and cell re-selection are mechanisms by which wireless devices in a wireless network determine which cell will connect to each wireless device. Initially, a wireless device may select a serving cell based on criteria such as a signal level of the cell. Once wireless communication is established with the serving cell, network events such as new cell integration, maintenance, or monitoring may trigger the wireless device to initiate a process of cell re-selection. Cell re-selection may include a neighbor relations protocol including measurement of signal levels and network characteristics for neighboring cells. The wireless device or another network node may report these measurements to the serving cell for use during a handover process.

Cells generally operate within band classes, identified by carrier signal frequency. Different band classes are deployed for different purposes, such as their associated carrier frequency being intended for primary usage by wireless devices, use in buildings, or to provide localized hotspots of wireless service. Access nodes in a wireless network may have multiple cells deployed within each access node to satisfy different requirements of wireless devices within the network. When the location or requirements of a wireless device change, it may be necessary for the wireless device to change from the serving cell to another neighboring cell. It is possible to monitor the reporting and selection of cells using data from the neighbor relations protocol in order to determine a preferred band class over a period of time, which can assist in the handover process.

Overview

Systems and methods are described for balancing wireless network load between band classes using automatic neighbor relations or another suitable neighbor relations protocol. A neighbor list for a serving cell may be configured at a beginning of a time period to include one or more first neighboring cells. Each of the first neighboring cells may be associated with a band class based on the frequency of signals sent and received by the cell. Using the neighbor list, a number of first neighboring cells in each of the band classes may be determined.

During the time period, network characteristics for one or more second neighboring cells may be received. The second neighboring cells may be distinct from, may overlap with, or may be a subset of the first neighboring cells. Each of the second neighboring cells may be associated with a band class.

At an end of the time period, the neighbor list may be reconfigured to include selected second neighboring cells based on the received network characteristics. Using the reconfigured neighbor list, a number of selected second neighboring cells in each of the band classes may be determined.

The number of first neighboring cells in each of the band classes at the beginning of the time period may be compared with the number of second neighboring cells at the end of the time period. Based on the comparison, a preferred band class for the time period may be determined.

DETAILED DESCRIPTION

Figure 1:
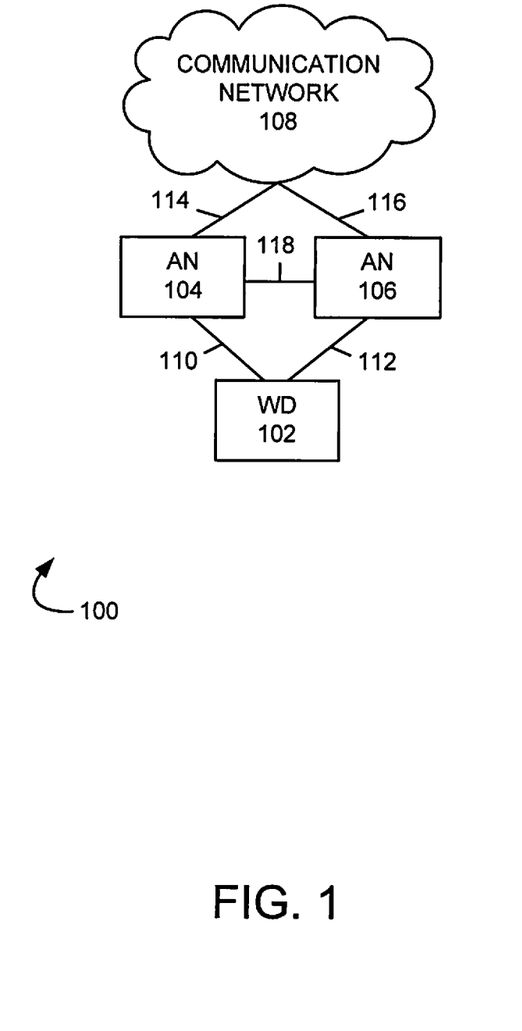
FIG. 1 illustrates an exemplary communication system to balance wireless network load between band classes using automatic neighbor relations.

FIG. 1 illustrates an exemplary communication system 100 to determine an access node for a wireless device comprising wireless device 102, access nodes 104 and 106, communication network 108, and communication links 110, 112, 114, and 116. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented.

Access nodes 104 and 106 are network nodes capable of providing wireless communications to wireless device 102, and can be, for example, a base transceiver station, a radio base station, a NodeB device, or an eNodeB device. Access nodes 104 and 106 may communicate with communication network 108 over communication links 114 and 116. Access nodes 104 and 106 may also communicate directly with each other over communication link 118. In an embodiment, access node 104 can comprise a serving access node for wireless device 102. Access nodes 104 and 106 may each comprise one or more cells, and each cell may be associated with a band class. In the embodiment where access node 104 is the serving access node, one of the cells within access node 104 is a serving cell.

Although only two access nodes 104 and 106 are illustrated in FIG. 1, wireless device 102 can be in communication with a plurality of access nodes, each access node comprising one or more cells. The plurality of access nodes can be associated with different networks and can support different communication protocols and radio access technologies. Furthermore, the one or more cells can be associated with different band classes deployed within the plurality of access nodes for various purposes.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or other types of communication equipment, as well as combinations thereof.

Communication links 110, 112, 114, 116, and 118 can be wired or wireless communication links. Wired communication links can comprise, for example, twisted pair cable, coaxial cable, or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, WiMAX, or 3GPP LTE, or combinations thereof. Other wireless protocols can also be used.

Figure 2:
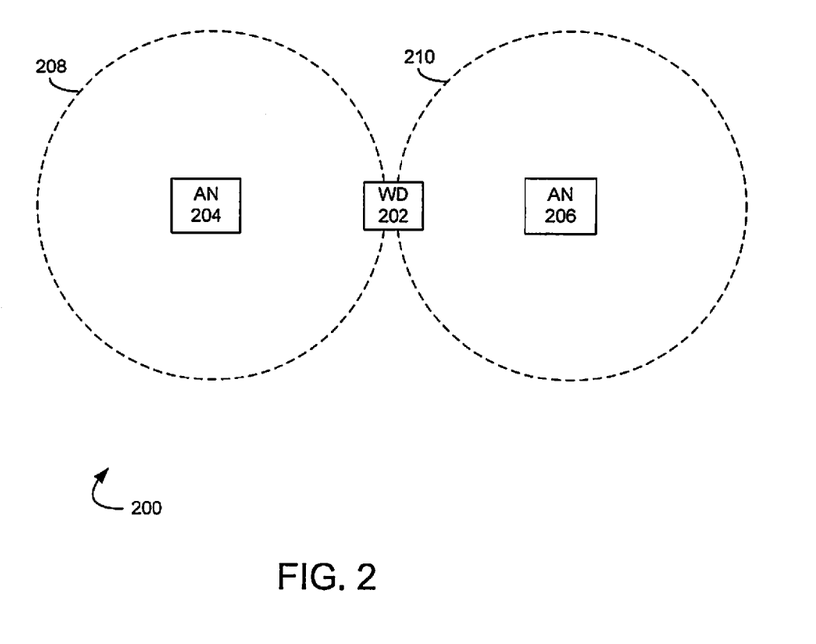
FIG. 2 illustrates another exemplary system to balance wireless network load between band classes using automatic neighbor relations.

FIG. 2 illustrates an exemplary communication system 200 to balance wireless network load between band classes using automatic neighbor relations. System 200 comprises at least one wireless device 202, access nodes 204 and 206, each access node comprising one or more cells, and signal radii 208 and 210. While only one wireless device is shown, it is to be understood that there will typically be more than one wireless device in communication with each access node. Wireless device 202 may comprise a device similar to wireless device 102 of FIG. 1. Similarly, access nodes 204 and 206 may comprise access nodes similar to access nodes 104 and 106 of FIG. 1.

A signal radius, or coverage radius, may comprise an area around an access node within which a wireless device can detect a signal transmitted from the access node. Signal radius 208 can comprise a radius for a reference signal, or pilot signal, transmitted from a cell of access node 204 and signal radius 210 can comprise a radius for a reference signal, or pilot signal, transmitted from a cell of access node 206.

In operation, wireless device 202 may establish communication with a cell of access node 204 such that access node 204 provides the wireless device access to a communication network (such as communication network 108, illustrated in FIG. 1). Access node 204 may transmit a reference signal, or a pilot signal, over signal radius 208 to enable wireless device 202 to detect access node 204. When wireless device 202 detects the reference signal from access node 204 and it is determined that the reference signal from access node 204 meets a threshold signal level, wireless device 202 may attempt to establish communication with access node 204. For example, the signal level may be represented by received signal strength indication (RSSI), reference signal received power (RSRP), reference signal received quality (RSRQ), signal to interference plus noise ratio (SINR), or any other suitable metric.

In an embodiment, when the reference signal from the cell of access node 204 meets a threshold signal level, wireless device 202 attempts to establish a wireless connection with the access node 204. In an embodiment, the wireless device 202 may also transmit a wireless device application requirement of the wireless device 202 during the attempt to establish the wireless connection, for example, a mobility of the wireless device 202. The wireless device application requirement may be used in cell selection, as it can determine which band class is most suitable for the wireless device 202.

In an exemplary embodiment, cells may be associated with band classes, which are defined by the frequency of signals sent and received by the cells. Examples of such band classes are 800 MHz, 1,900 MHz, and 2,500 MHz. However, the use of the term band classes is not limited to these specific examples. Each of the band classes may be suitable for particular wireless device requirements based on its deployment.

In an embodiment, communication system 200 may be configured to manage access node neighbor relations. For example, communication system 200 may implement a self-organizing network (SON) protocol that includes an automatic neighbor relations (ANR) process, or may implement any other suitable protocol for managing access node and cell neighbor relations.

In an embodiment, access node 204 may not be aware of one or more cells within access node 206. For example, access node 204 may track neighbor access nodes and their cells using a neighbor list to store information about access node 204's cell neighbors. However, the neighbor list(s) for one or more cells within access node 204 may be limited in total number of cell neighbors or number of cell neighbors in each band class. The neighbor list may be configured at a beginning of a time period to include cells known to be suitable for handover of wireless devices. When a cell is reported that is not on the neighbor list, the network characteristics of the cell may be determined. If the network characteristics of the previously unknown cell indicate that it is a suitable candidate for handover of wireless devices from the serving cell within access node 204, the neighbor list may be reconfigured to include the previously unknown cell. Due to the limited space available in the neighbor list, it may be necessary to remove cells from the neighbor list which are less suitable for handover based on their network characteristics.

The neighbor list may be separately maintained in a distinct database, or may be part of a neighbor relations table (NRT), and the NRT may also store identifiers for neighboring access nodes and their respective cells, such as physical cell identifiers (PCI), cell global identifications (CGI), E-UTRAN cell identifiers (ECI), E-UTRAN cell global identifiers (ECGI), eNodeB identifiers (eNB-ID), or the like, connection information (e.g., X2 connection information), handover information, and any other relevant neighbor information. In this example, the neighbor list or the NRT for access node 204 may not contain an entry for one or more of the cells within access node 206.

In an embodiment, access node 206 may comprise a new access node, or a new cell within the access node 206. In other words, one or more cells within access node 206 may have been connected to communication network 200 recently (e.g., within a threshold time period). In this example, access node 204 may not be aware of access node 206, or one of its cells, because it is a new access node or a new cell. Access node 204 may be configured to discover cells of access node 206 using, for example, an ANR process. ANR and similar protocols may be especially useful in rapidly developing networks in which new access nodes and new cells are added within relatively short periods of time. These types of protocols allow access nodes to become aware of neighbors and their respective network characteristics without manual updating of databases by network operators, which can be time consuming and expensive to continually provide updated information.

In an embodiment, access node 204 may use wireless devices such as wireless device 202 in communication with access node 204 in order to discover new neighbor access nodes (cells). For example, access node 204 may communicate with wireless device 202 in order to discover one or more neighbor access nodes such as access node 206. Here, access node 204 may transmit criteria, such as ANR criteria or criteria of another suitable protocol, to wireless devices in communication with access node 204 (e.g., wireless device 202). The ANR or other protocol criteria may comprise criteria based on relative signal information received at the wireless devices. An event may be triggered at wireless device 202 based on a comparison of the received criteria, a signal level for a reference signal or pilot signal received from access node 204, and a signal level for a reference signal or pilot signal received from access node 206.

In another embodiment, access node 204 may already be aware of each cell within access node 206, and one or more of the cells within 206 may be contained in the neighbor list for at least one cell within access node 204. However, based on a network event such as maintenance, monitoring, or detection of reference signal levels above or below a threshold, access node 204 may trigger wireless device 202 to provide information about access node 206, such as a signal level for a reference signal of access node 206. As noted above, wireless device 202 is representative of one or more wireless devices in communication with a particular serving cell within access node 204.

In response to the triggered event, wireless device 202 may transmit a measurement report to access node 204 comprising one or more signal levels for each reference signal or pilot signal received at the wireless device from cells within access nodes such as access node 206 having signal radii that cover an area in which the wireless device is located, and at least one identifier (e.g., PCI, CGI, ECI, ECGI, eNB-ID, or the like) for each reported access node. In an embodiment, the measurement report may comprise only signal levels that are above a signal level threshold.

Access node 204 may receive the measurement report and compare the access node and cell identifiers in the NRT and in the neighbor list against those in the received measurement report. If one or more cells within access node 204 is not aware of at least one cell within access node 206, the NRT or neighbor list for a cell within access node 204 may not include information about at least one cell within access node 206. Accordingly, access node 204 may begin a process to add access node 206 as a neighbor (i.e., update the NRT or neighbor list to include information for access node 206). In an embodiment, access node 204 may instruct wireless device 202 to retrieve an identifier for access node 206 and to transmit the access node identifier to access node 204. Using the access node or cell identifier, access node 204 may retrieve an IP address for one or more cells within access node 206 (e.g., from a controller node such as an MME). A communication link may then be established between at least one cell within access node 204 and at least one cell within access node 206 (e.g., through an X2 connection). Based on this process, access node 204 may update the NRT or the neighbor list to include identifier information about access node 206.

In an embodiment, an access node may request network characteristics from cells within all access nodes identified in the measurement report provided by each wireless device with which the access node is in communication. Access node and cell network characteristics may comprise current and/or historical data including a utilization indicator such as physical resource block (PRB) usage, a connectivity indicator such as number of RRC connections, a capacity indicator such as average data volume per RRC connection, and handover statistics for each access node and their respective cells. In an embodiment, handover statistics may comprise a number of requests for handover to each cell. The number of requests for handover can be an indicator of overall demand for a band class, but network characteristics are not limited to this information, as a preferred band class may also be related to signal levels for each cell. The access node and cell network characteristics for access node 206 and other reported neighbor access nodes may be used to reconfigure the neighbor list with cells having preferred network characteristics.

As a result of the configuration of access node and cell entries in the NRT and the neighbor list for each cell within access node 204, a handover may be requested or performed between a cell within access node 204 and a cell within access node 206. However, handovers between access nodes may sometimes fail. The occurrence of such handover failures may be tracked in handover statistics as a handover failure rate. Such a handover failure rate may be a part of the network characteristics transmitted by access node 206, and further used to determine whether access node 206 may be a suitable candidate for cell re-selection.

Figure 3:
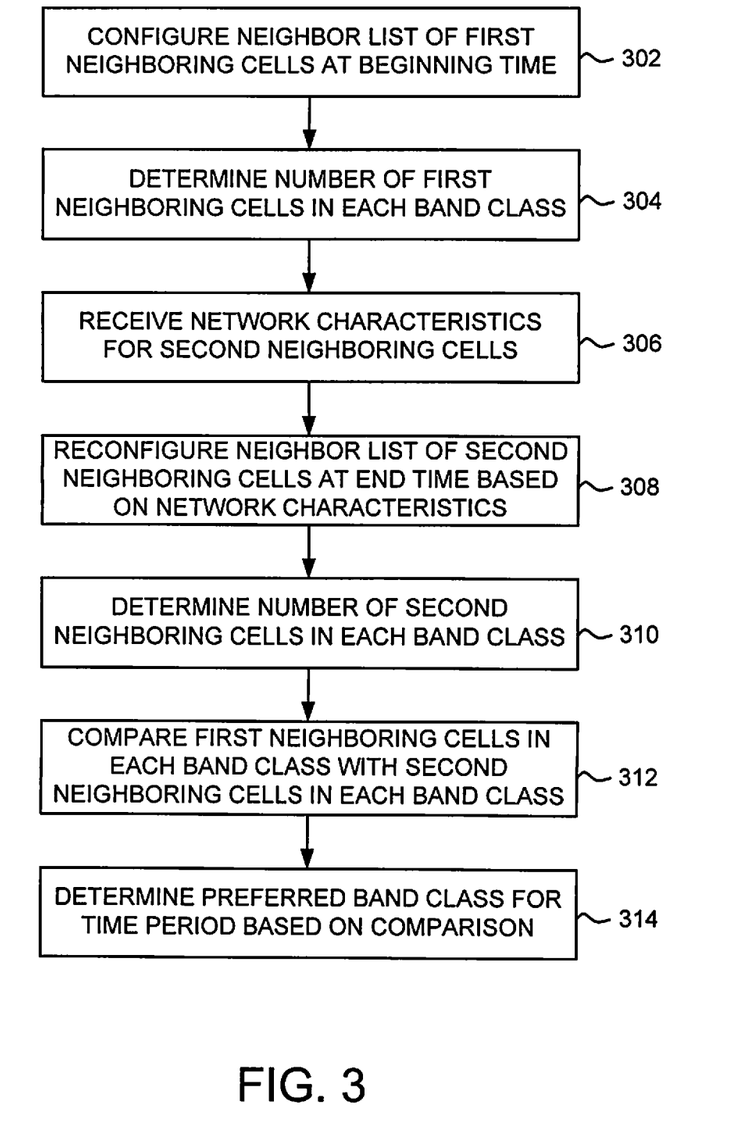
FIG. 3 illustrates an exemplary method of to balancing wireless network load between band classes using automatic neighbor relations.

FIG. 3 illustrates an exemplary method for balancing network load between band classes using automatic neighbor relations. The method will be discussed with reference to the exemplary communication system 200 illustrated in FIG. 2, however, the method can be implemented with any suitable communication system.

Referring to FIG. 3, at step 302, a neighbor list for a particular cell may be configured to include one or more first neighboring cells. The neighboring cells may be detected by wireless devices or by other network nodes, and may be reported to a serving cell such as one of the cells located within access node 204 through an ANR protocol or any other suitable protocol for managing neighbor relations between cells. Each of the one or more first neighboring cells such as those located within access node 206 may be associated with a band class based on frequencies of signals sent and received by the cell.

Signal information for cells within one or more of the second access nodes may be received by a cell within the first access node in response to a reporting event triggered at one or more wireless devices served by the first access node. The reporting event may be based on a first signal level of the first access node and a second signal level of one of more of the second access nodes. However, the reporting event may also be based on scheduled access node maintenance or monitoring, or any other relevant network event. In one exemplary embodiment, wireless device 202 may receive a reference signal or pilot signal from access node 204 at a received signal level and a reference signal or pilot signal from access node 206 at a received signal level. In an embodiment, a reporting event may be triggered at the wireless device 202 based on at least the received first signal level and the received second signal level. In response to the reporting event, wireless device 202 may transmit signal information comprising a signal level for the reference signal or pilot signal received from access node 206 and an identifier for access node 206 (e.g., PCI, CGI, ECI, ECGI, eNB-ID, or the like). Although only access nodes 204 and 206 are shown, it is to be understood that there may be a plurality of access nodes similar to access nodes 204 and 206 from which wireless device 202 may receive reference signals, and as noted above there may be multiple cells within each access node.

Access node 204 may comprise an NRT and a neighbor list, and it may be determined that neighbor information for access node 206 is not included in the NRT for one or more cell within access node 204. Alternatively, access node 204 may already be aware of access node 206, and so the NRT for access node 204 may contain an entry for access node 206. In an embodiment, an access node or cell communication link (e.g., an X2 connection) may be established between access node 204 and access node 206. In a further embodiment, a handover of wireless device 202 may be performed from access node 204 to a cell within access node 206 based on the established communication link.

At step 304, a number of first neighboring cells associated with each of the band classes may be determined at a beginning of a time period. In an exemplary embodiment, it may be determined that there are 5 neighboring cells associated with the 800 MHz band class, 10 neighboring cells associated with the 1,900 band class, and 30 neighboring cells associated with the 2,500 MHz band class. These band classes are merely examples of possible band classes and are not intended to limit the scope of the claimed invention. The determined number of first neighboring cells associated with each of the band classes may be stored in the serving cell and/or reported to another network node for later comparison.

The previously established communication link may be used to transmit network characteristics from each of the cells within second access nodes to one or more cells within the first access node. In an embodiment, access node 204 may receive network characteristics from one or more cells within access node 206, and the network characteristics may be used to determine whether access node 206 would be a suitable candidate for handover of wireless devices such as wireless device 202. In another embodiment, one or more cells within access node 204 may receive access node or cell network characteristics from another network node, such as a controller node.

At step 306, network characteristics are received during the time period for one or more second neighboring cells. The network characteristics may be received by the serving cell within access node 204, or may be received by another network node. The network characteristics may be transmitted by yet another node, by wireless devices, or by the access nodes within which the cells are located. The one or more second neighboring cells are neighboring cells that are detected through an automatic neighbor relations protocol or another other suitable protocol and may be distinct from, may overlap with, or may be a subset of the one or more first neighboring cells. The network characteristics may comprise information that may demonstrate a preference of wireless devices various cells among the second neighboring cells. An exemplary embodiment of network characteristics for second neighboring cells is a number of requests for handover to each of the second neighboring cells during the time period.

At step 308, the neighbor list may be reconfigured with selected second neighboring cells based on the received network characteristics. In one example, second neighboring cells may be selected for the reconfigured list based on the received number of requests for handover to these second neighboring cells. However, there may be other network characteristics for selecting second neighboring for the reconfigured neighbor list, such as relative signal levels, overall resource block usage, connectivity indicators, or other relevant information regarding capability to initiate and sustain wireless connection for a given purpose, such as mobility or application requirements.

At step 310, a number of second neighboring cells associated with each band class may be determined. In an exemplary embodiment, it may be determined that there are 5 second neighboring cells associated with the 800 MHz band class, 15 second neighboring cells associated with the 1,900 band class, and 15 second neighboring cells associated with the 2,500 MHz band class. These band classes and numbers are merely examples of possible band class identifications and are not intended to limit the scope of the claims. The determined number of second neighboring cells associated with each of the band classes may be stored in the serving cell and/or reported to another network node for later comparison with a subsequently reconfigured neighbor list.

Furthermore, while band classes may be identified by a representative frequency, it is understood that each band class covers a range of frequencies. Particular frequencies and band classes have been deployed to different degrees throughout various wireless networks. Each frequency may be deployed for a different purpose, based on the ownership of broadcast rights at certain frequencies, the capabilities of each frequency to maintain connections over various distances or to penetrate walls of buildings, issues of interfering signals, or relative costs of installation or upgrades of hardware and software at each access node.

At step 312, the number of first neighboring cells in each of the band classes at the beginning of the time period may be compared with the number of second neighboring cells in each of the band classes at the end of the time period. Using the above example, the 800 MHz band class was associated with 5 first neighboring cells and 5 second neighboring cells, so there was no change. The 1,900 MHz band class was associated with 10 first neighboring cells and 15 second neighboring cells, indicating a net increase of 5 neighboring cells in this band class. The 2,500 MHz band class was associated with 30 first neighboring cells and 15 second neighboring cells, indicating a net decrease of 15 neighboring cells. For this particular comparison, the precise identities of the first and second neighboring cells are not necessarily contained within the neighbor list, as the determined number of neighboring cells in each band class is measured by the band class identifying information. Access node and cell identities may still be tracked in the NRT for each serving cell or access node, and also used in ANR protocols, but these precise cell identities are not necessary for the implementation of the presently disclosed method based on determining the association of cells with band classes.

At step 314, a preferred band class for the time period is determined based on the results of comparison step 312. Referring again to the above example, the 800 MHz band class experienced no net change in the number of neighboring cells, the 1,900 MHz band class experienced a net increase of 5 neighboring cells, and the 2,500 MHz band class experienced a net decrease of 15 neighboring cells during the time period, and the change may be based on indications from received network characteristics that a cell is preferred for handover. Thus, in the illustrative example, the 1,900 MHz band class experienced the greatest positive change, indicating that it was the preferred band class for the time period. In another exemplary embodiment, it may be determined that multiple band classes experience the same amount of increase in number of neighboring cells over the time period, and that this increase is greater than that of any other band class over the time period. Based on this example, it would be possible to determine that each of the band classes that experience the greatest amount of increase have equal status as preferred band class. However, it would also be possible to consider criteria such as the band class of the serving cell compared with the band classes that are equal in amount of increase to determine a preferred band class. In yet another exemplary embodiment, if all band classes experience a net decrease in the number of neighboring cells, then the band class or classes with the smallest decrease in the number of neighboring cells over the time period may be determined to be a preferred band class for that time period.

Figure 4:
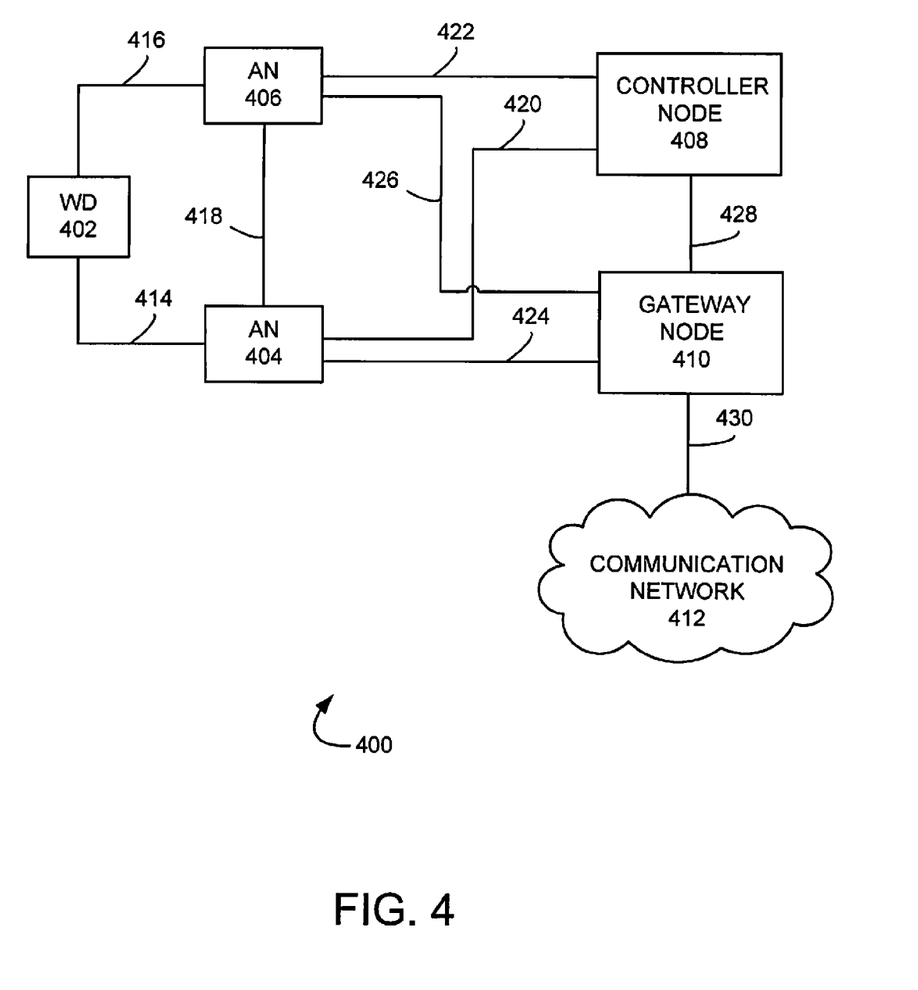
FIG. 4 illustrates another exemplary system to balance wireless network load between band classes using automatic neighbor relations.

FIG. 4 illustrates another exemplary communication system 400 to determine a communication access node for a wireless device. Communication system 400 may comprise a wireless device 402, access nodes 404 and 406, controller node 408, gateway node 410, communication network 412, and communication links 414, 416, 418, 420, 422, 424, 426, 428, and 430. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, a NodeB device, or an enhanced NodeB (eNodeB) device. In an embodiment, access node 404 can comprise a serving access node for wireless device 402. Access nodes 404 and 406 may communicate with controller node 408 over communication links 420 and 422, and with gateway node 410 over communication links 424 and 426. Access nodes 404 and 406 may also communicate directly with each other over communication link 418.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and combinations thereof. In an embodiment, controller node 408 may perform portions of the steps illustrated in the methods of FIGS. 3 and 5.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and combinations thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, 424, 426, 428, and 430 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may facilitate communication among access nodes 404 and 406, controller node 408, gateway node 410, and communication network 412 which are omitted for clarity, including additional processing nodes, routers, gateways, and physical and/or wireless data links for carrying data among the various network elements.

Figure 5:
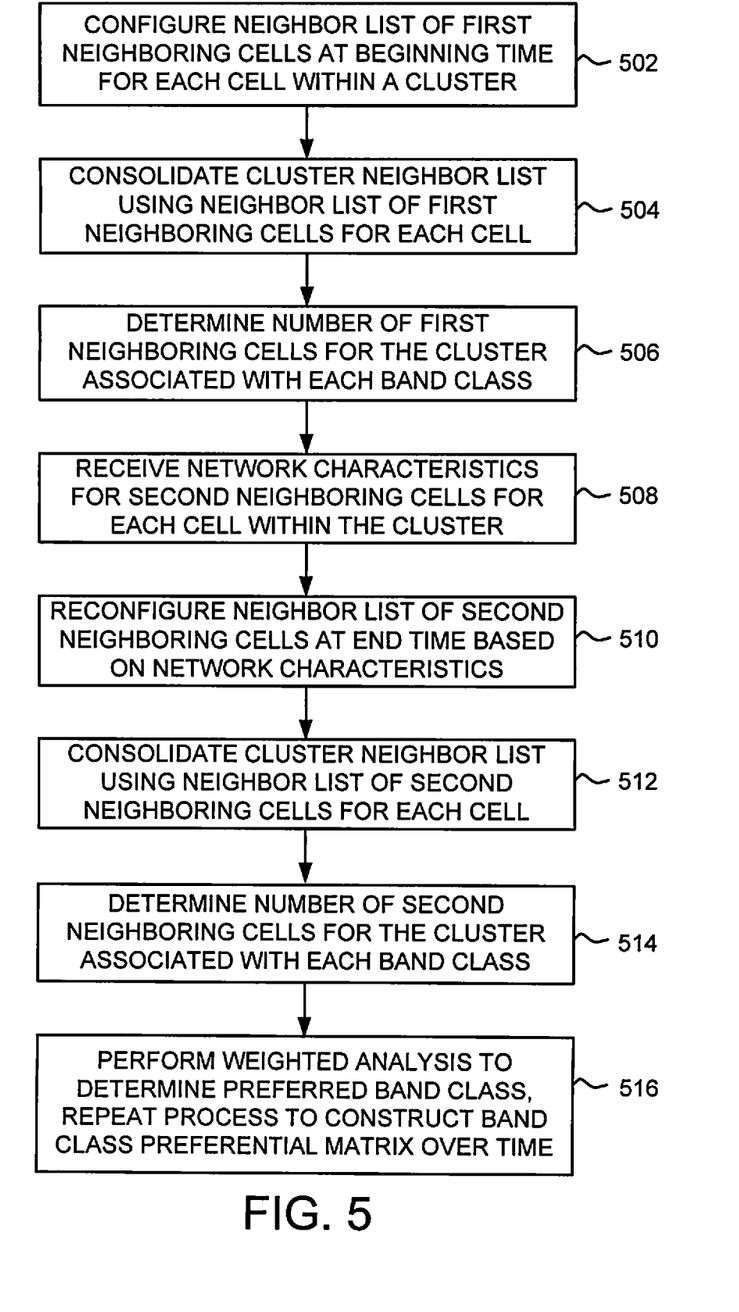
FIG. 5 illustrates another exemplary method of balancing wireless network load between band classes using automatic neighbor relations.

FIG. 5 illustrates an exemplary method for determining whether an access node is a candidate for handover of wireless devices. The method will be discussed with reference to the exemplary communication system 400 illustrated in FIG. 4, however, the method can be implemented with any suitable communication system.

Referring to FIG. 5, at step 502, a neighbor list for each cell within a predefined cluster may be configured to include one or more first neighboring cells. The predefined cluster may be selected by a network operator, and the size may range from a single access node, a single band class, one or more carriers within a band class, or an entire market, such as a city or other geographic location. The neighboring cells for each cell within the predefined cluster may be detected by wireless devices or by other network nodes, and may be reported to the serving cells such as cells located within access node 404 through an ANR protocol or any other suitable protocol for managing neighbor relations between cells. Each of the one or more first neighboring cells such as those located within access node 406 may be associated with a band class based on carrier frequencies of signals sent and received by the cell, which may also be referred to as downlink and uplink transmissions, respectively.

Signal information for cells within one or more of the second access nodes may be received by the first access node in response to a reporting event triggered at one or more wireless devices. The reporting event may be based on relative signal levels of the first and second access nodes. However, the reporting event may also be based on scheduled access node maintenance or monitoring, or any other relevant network event. In one exemplary embodiment, wireless device 402 may receive a reference signal or pilot signal from access node 404 at a received signal level and a reference signal or pilot signal from access node 406 at a received signal level. In an embodiment, a reporting event may be triggered at the wireless device 402 based on at least the received first signal level and the received second signal level. In response to the triggered reporting event, wireless device 402 may transmit signal information comprising a signal level for the reference signal or pilot signal received from access node 406 and an identifier for all neighboring access nodes and cells such as those within access node 406 (e.g., PCI, CGI, ECI, ECGI, eNB-ID, or the like). Although only access nodes 404 and 406 are shown, it is to be understood that there may be additional access nodes similar to access nodes 404 and 406 from which wireless device 402 may receive reference signals.

Access node 404 may comprise an NRT and a neighbor list, and it may be determined that neighbor information for access node 406 is not included in the NRT for one or more cell within access node 404. Alternatively, access node 404 may already be aware of access node 406, and so the NRT for access node 404 may contain an entry for access node 206. In an embodiment, an access node or cell communication link (e.g., an X2 connection) may be established between access node 404 and access node 406. In a further embodiment, a handover of wireless device 402 may be performed from access node 404 to a cell within access node 406 based on the established communication link.

In an embodiment, it is determined whether a communication link has been established between the first access node and each second access node based on the received identifiers. If not, the first access node establishes the communication link with each second access node for which a communication link is not already established. For example, access node 404 may comprise an NRT and it may be determined that neighbor information for access node 406 is not included in the NRT for access node 404. Accordingly, an access node communication link (e.g., an X2 connection) may be established between access node 404 and access node 406. Alternatively, access node 404 may already be aware of access node 406, and so the NRT for access node 404 may contain an entry for access node 406. In an embodiment, a handover may be performed of wireless device 402 from access node 404 to access node 406 based on the established communication link.

The established communication link may be used to transmit network characteristics from each of the first neighboring cells at a beginning of a time period to each serving cell within the predefined cluster. In an embodiment, access node 404 may be within the predefined cluster, and access node 404 may receive network characteristics from access node 406, which may be used to determine whether access node 406 would be a suitable candidate for handover of wireless device 402 and therefore inclusion in the NRT or neighbor list for one or more cells within access node 404. Access node and cell network characteristics may comprise current and/or historical data including a utilization indicator (e.g. PRB usage), a connectivity indicator (e.g. number of RRC connections), a capacity indicator such as average data volume per RRC connection, and handover statistics for each access node. In another embodiment, access node 404 may receive network characteristics for access node 406 from another network node, such as a controller node.

At step 504, a consolidated neighbor list for all cells within the predefined cluster of cells is configured at the beginning of the time period. The consolidated list may be based on a weighted analysis of network characteristics for each reported cell within the predefined cluster. Furthermore, the weighted analysis may be based on a number of times each cell is reported within a unique NRT or neighbor list.

At step 506, a number of first neighboring cells in the consolidated list of neighbors within the cluster of cells may be associated with each of the band classes at a beginning of a time period. In an exemplary embodiment, it may be determined that there are 5 neighboring cells associated with the 800 MHz band class, 10 neighboring cells associated with the 1,900 band class, and 30 neighboring cells associated with the 2,500 MHz band class. These band classes provide examples of possible band class carrier frequencies and are not intended to limit the scope of the claimed invention. Further, it is known that the band classes comprise a range of frequencies encompassing the representative frequency. The determined number of first neighboring cells associated with each of the band classes may be stored in each of the serving cells and/or reported to another network node for later comparison.

At step 508, network characteristics are received during the time period for one or more second neighboring cells. The network characteristics may be received by serving cells in the predefined cluster, such as those within access node 404, or may be received by another network node. The network characteristics may be transmitted by yet another node, by wireless devices, or by the access nodes within which the cells are located. The one or more second neighboring cells are neighboring cells that are detected through an automatic neighbor relations protocol or another suitable protocol, and may be distinct from, may overlap with, or may be a subset of the one or more first neighboring cells. The network characteristics may comprise information that may demonstrate a preference of wireless devices for particular second neighboring cells. An exemplary embodiment of network characteristics for second neighboring cells is a number of requests for handover to each of the second neighboring cells during the time period. Various examples of criteria that may be considered in calculating the NRT removal condition include the signal level, the signal interference, the utilization indicator, the connectivity indicator, the capacity indicator, and the handover statistics as a particular access node.

At step 510, the neighbor list for each cell may be reconfigured with selected second neighboring cells based on the received network characteristics. In one example, second neighboring cells may be selected for the reconfigured list of a cell such as one within access node 404 based on the received number of requests for handover to these second neighboring cells, such as one or more cells within access node 406. There may also be other types of network characteristics for selecting second neighboring for the reconfigured neighbor list, such as relative signal levels or interference within cells of the cluster or between neighbor cells, overall data usage, number of successful cell re-selections, or other relevant information regarding capability to initiate and sustain wireless connection for a given purpose, such as mobility or application requirements.

At step 512, a consolidated neighbor list for all cells within the predefined cluster of cells is configured at the end of the time period. The consolidated list may be based on a weighted analysis of network characteristics for each reported cell within the predefined cluster. Furthermore, the weighted analysis may be based on a number of times each cell is reported within a unique NRT or neighbor list for a cell within the predefined cluster.

At step 514, a number of second neighboring cells associated with each band class may be determined. In an exemplary embodiment, it may be determined that there are 5 second neighboring cells associated with the 800 MHz band class, 15 second neighboring cells associated with the 1,900 band class, and 15 second neighboring cells associated with the 2,500 MHz band class. These band classes and numbers are merely examples of possible band class identifications and are not intended to limit the scope of the claims. The determined number of second neighboring cells associated with each of the band classes may be stored in one or more of the serving cells within the cluster and/or reported to another network node for later comparison with a subsequently reconfigured neighbor list comprised of one or more cell neighbor lists.

Furthermore, while band classes may be identified by a representative frequency, it is understood that each band class covers a range of frequencies. Particular frequencies and band classes have been deployed to different degrees throughout various wireless networks. Each frequency may be deployed for a different purpose, based on the ownership of broadcast rights at certain frequencies, the capabilities of each frequency to maintain connections over various distances or to penetrate walls of buildings, issues of interfering signals, or relative costs of installation or upgrades of hardware and software at each access node.

In step 516, a weighted analysis may be performed based on determined differences between the consolidated neighbor list comprising first neighboring cells and the consolidated neighbor list comprising second neighboring cells. This weighted analysis may provide an indication of the preferred band class for cells that are potential handover candidates for wireless devices. If a particular band class is preferred during a time period, it may be an indication that the particular band class is disproportionately loaded when compared with other band classes associated with neighboring cells. Thus, it may be desirable to instruct wireless devices attempting to initiate connection with or re-select a neighboring cell to give higher priority for handover to neighboring cells in a non-preferred band class.

Furthermore, it may be desirable to monitor historical data over multiple time periods. In one illustrative example, a cluster may be monitored over one or more days, weeks, months, years, portions thereof, or other predefined time periods or seasons, with individual time periods being cumulated together to form a band class preferential matrix for the cluster. As an embodiment of such a matrix, it is noted that a cluster may be monitored over a week, with the matrix organized by day of the week along one axis and time of day along another axis. The time of day may be subdivided by one hour long increments, or by increments of any other predefined amount of time. Within the matrix, a determined preferred band class for the cluster may be provided for each hour of each day. This historical data may be stored by access nodes or by network nodes in order to provide instruction to wireless devices attempting to establish wireless communications with neighboring cells. If it is known that a particular band class tends to be busy at a certain time of day within a predefined cluster of cells, it may be desirable to balance the load of wireless devices toward neighboring cells in a band class other than the preferred band class. For example, when loading on a preferred band class surpasses a threshold loading based on various network characteristics, a user for a wireless device connected to a cell within the preferred band class may experience poor connection quality due to congestion of the network caused by loading. Thus, the band class preferential matrix for the cluster may be created and updated to instruct wireless devices to select cells in a non-preferred band class based on a band class handover priority during a time period.

A band class handover priority may have an inverse relationship with the status of the band class as a preferred band class. In one illustrative example, when a cell is part of a preferred band class, there may be a column in the NRT corresponding to that cell that may be assigned a value such as a "1", whereas that column may be assigned a value such as a "0" when the band class associated with the cell is not the preferred band class. Using this value, a band class handover priority may be determined as the inverse of the preferred band class status. That is, when a cell is associated with the preferred band class, a column in the NRT corresponding to that cell may be assigned a value such as "0", whereas that column may be assigned a value such as "1" when the cells belongs to a band class that is not preferred for the particular time period. These values are mere examples of a particular embodiment of the disclosed subject matter, and the claims are not limited to these specific examples. Different techniques and values may be used or assigned in order to establish a priority for instructing cells to select from among multiple band classes. Furthermore, while the band class preferential matrix may provide a guide to preferred band classes, various other factors may be considered in determining whether to select a particular cell for wireless connection, such as proximity, mobility, and/or application requirements of one or more wireless devices.

In an embodiment, application requirements of one or more wireless devices may comprise service conditions that a wireless device requests from an access node, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. In an embodiment, the application requirements may be based on one or more applications running on one or more wireless devices such as wireless device 402 when these wireless devices attempt to wirelessly connect with a cell that within the cluster or within the consolidated list of neighboring cells for the cluster.

In another embodiment, separate band class preferential matrices may be constructed for each band class or each carrier within a cluster. After constructing each matrix, the results may be aggregated to form the consolidated band class preferential matrix over part or all of the time period. The consolidated band class preferential matrix may be reconstructed with updated information from one or more separate matrices.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 6:
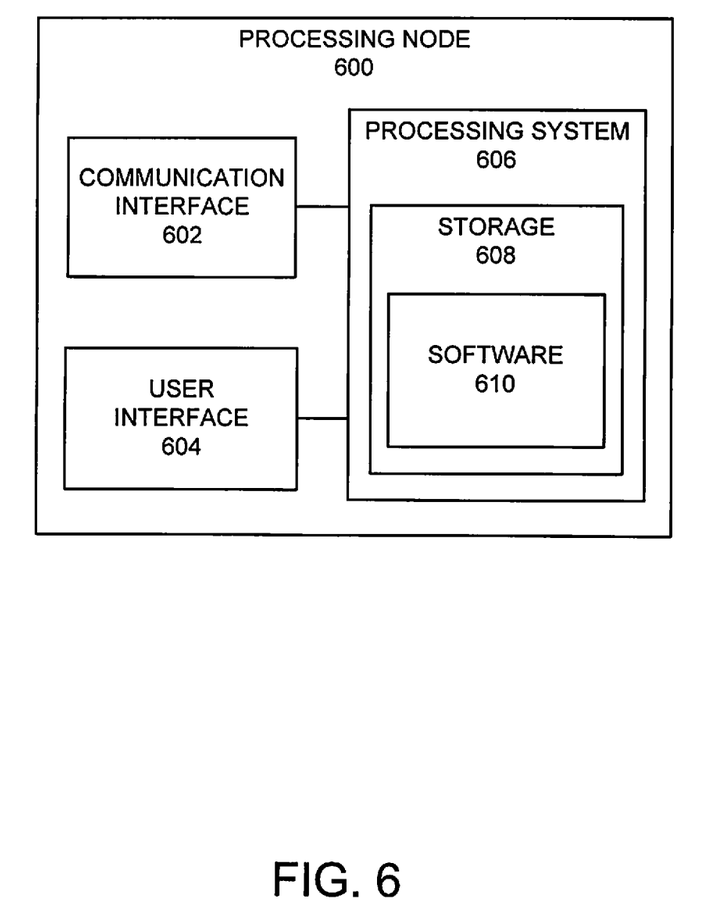
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 408 and gateway node 410. Processing node 600 can also be an adjunct or component of a network element, such as an element of access nodes 104, 106, 404, or 406. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for load balancing wireless devices in a network, comprising:
    configuring an initial neighbor list at a beginning of a time period to include one or more first neighboring cells, wherein the one or more first neighboring cells are associated with one or more band classes, the one or more band classes being identified by their representative signal frequencies;
    determining a number of the one or more first neighboring cells in the initially configured neighbor list associated with each of the one or more band classes at the beginning of the time period;
    receiving network characteristics during the time period for one or more second neighboring cells, wherein the one or more second neighboring cells are associated with the one or more band classes;
    reconfiguring the neighbor list to include second neighboring cells selected from among the one or more second neighboring cells based on the received network characteristics;
    determining a number of the selected second neighboring cells in the reconfigured neighbor list associated with each of the plurality of band classes at an end of the time period;
    comparing the number of initially configured first neighboring cells in each of the band classes at the beginning of the time period with the number of reconfigured selected second neighboring cells in each of the band classes at the end of the time period; and
    determining a preferred band class for the time period based on the comparison.

2. The method of claim 1, further comprising instructing at least one wireless device in the network to initiate a wireless connection with a neighboring cell that is associated with a band class other than the preferred band class.

3. The method of claim 1, wherein configuring the initial neighbor list further comprises initially configuring a neighbor list of one or more first neighboring cells for each of a plurality of serving cells in a predefined cluster, the predefined cluster being determined by one or more of signal frequency and geographic location of the serving cells, and wherein reconfiguring the neighbor list further comprises reconfiguring the neighbor list to include selected second neighboring cells for each of the plurality of serving cells in the predefined cluster.

4. The method of claim 3, further comprising constructing a consolidated initial neighbor list of initially configured first neighboring cells and a consolidated reconfigured neighbor list of reconfigured selected second neighboring cells for the predefined cluster of serving cells using the initially configured and the reconfigured neighbor lists for each of the plurality of serving cells.

5. The method of claim 4, wherein receiving network characteristics during the time period further comprises receiving by each of the plurality of serving cells network characteristics for the one or more second neighboring cells, and reconfiguring the consolidated reconfigured neighbor list further comprises selecting from among all of the one or more second neighboring cells based on the received network characteristics.

6. The method of claim 5, wherein comparing the number of initially configured first neighboring cells with the number of reconfigured selected second neighboring cells comprises performing a weighted analysis of a number of neighboring cells that were added in each of the band classes and a number of neighboring cells that were removed from each of the band classes during the time period based on a comparison with the consolidated list of reconfigured second neighboring cells.

7. The method of claim 5, further comprising repeating the method steps over a plurality of time periods and constructing a band class preferential matrix including the preferred band class within the predefined cluster for each of the plurality of time periods.

8. The method of claim 7, further comprising instructing one or more wireless devices to initiate a wireless connection with a neighboring cell in a band class other than the preferred band class included in the constructed band class preferential matrix for a time period corresponding to a request to initiate the wireless connection.

9. The method of claim 1, wherein the received network characteristics comprise a number of requests for handover to each of the one or more second neighboring cells.

10. The method of claim 1, wherein comparing the preferred band class further comprises determining an amount of increase or an amount of decrease between the number of initially configured first neighboring cells in each of the band classes and the number of reconfigured selected second neighboring cells in each of the band classes and determining the preferred band class further comprises determining which of the band classes had the largest increase or the smallest decrease during the time period.

11. A system for load balancing wireless devices in a network, comprising:
a cluster of one or more serving cells, each of the serving cells configured to:
configure an initial neighbor list at a beginning of a time period to include one or more first neighboring cells, wherein the one or more first neighboring cells are associated with one or more band classes, the one or more band classes being identified by their representative signal frequencies;
determine a number of the one or more first neighboring cells in the initially configured neighbor list associated with each of the one or more band classes at the beginning of the time period;
receive network characteristics during the time period for one or more second neighboring cells, wherein the one or more second neighboring cells are associated with the one or more band classes;
reconfigure the neighbor to include second neighboring cells selected from among the one or more second neighboring cells based on the received network characteristics;
determine a number of the selected second neighboring cells in the reconfigured neighbor list associated with each of the plurality of band classes at an end of the time period;
compare the number of initially configured first neighboring cells in each of the band classes at the beginning of the time period with the number of reconfigured selected second neighboring cells in each of the band classes at the end of the time period; and
determine a preferred band class for the time period based on the comparison.

12. The system of claim 11, wherein each of the one or more serving access nodes is further configured to instruct at least one wireless device in the network to initiate a wireless connection with a neighboring cell that is associated with a band class other than the preferred band class.

13. The system of claim 11, wherein the cluster is determined by one or more of signal frequency and geographic location of the serving cells, and the network further comprises a network node configured a consolidated initial neighbor list of initially configured first neighboring cells and a consolidated reconfigured neighbor list of reconfigured selected second neighboring cells for the cluster of serving cells using the initially configured and the reconfigured neighbor lists for each of the one or more serving cells.

14. The method of claim 13, wherein the network node is further configured to perform a weighted analysis of a number of neighbors that were added in each of the band classes throughout the cluster and a number of neighbors that were removed from each of the band classes throughout the cluster during the time period based on a comparison with the consolidated list of reconfigured second neighboring cells.

15. The method of claim 13, wherein each of the serving cells is further configured to repeat the method steps over a plurality of time periods, and the network node is further configured to construct a band class preferential matrix including the preferred band class within the cluster for each of the plurality of time periods.

16. The system of claim 15, wherein each of the serving cells is further configured to instruct one or more wireless devices to initiate a wireless connection with a neighboring cell in a band class other than the preferred band class included in the constructed band class preferential matrix for a time period corresponding to a request to initiate the wireless connection.

17. The system of claim 11, wherein the received network characteristics comprise a number of requests for handover to each of the one or more second neighboring cells.

18. The system of claim 11, wherein each of the serving access nodes is further configured to compare the preferred band class by determining an amount of increase or an amount of decrease between the number of initially configured first neighboring cells in each of the band classes and the number of reconfigured selected second neighboring cells in each of the band classes and determining the preferred band class further comprises determining which of the band classes had the largest increase or the smallest decrease during the time period.

* * * * *